April 5, 1927.
T. H. FROST ET AL
1,623,238
DYNAMOMETER GAUGE
Filed May 8, 1925
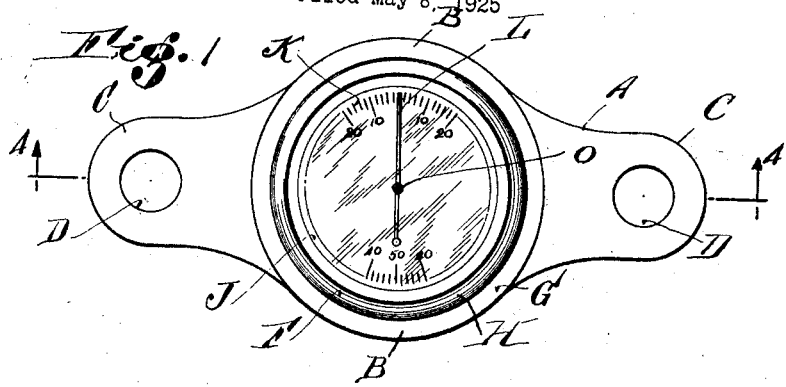
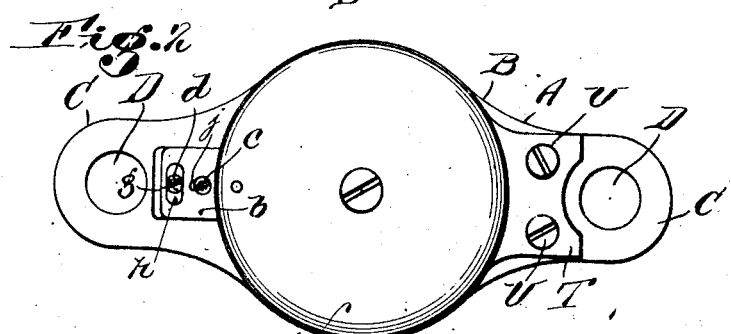
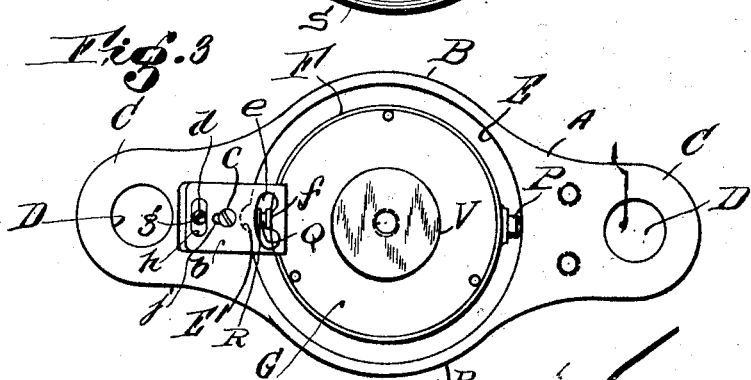
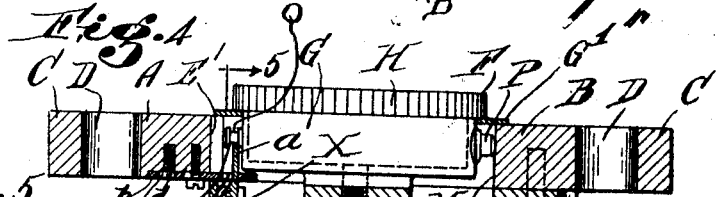
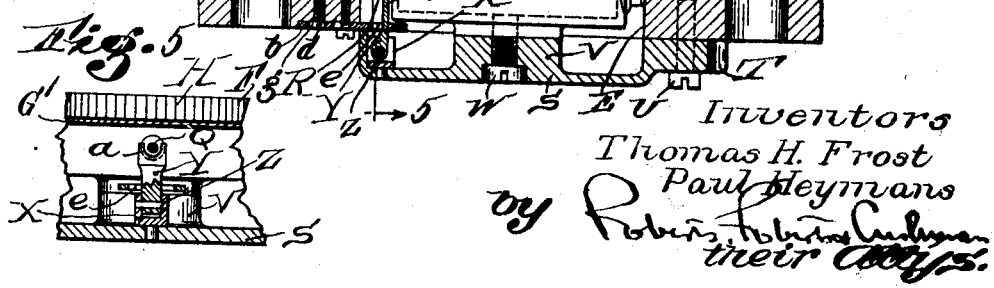
Inventors
Thomas H. Frost
Paul Heymans
by Roberts Roberts Cushman
their Attys.

Patented Apr. 5, 1927.

1,623,238

UNITED STATES PATENT OFFICE.

THOMAS H. FROST AND PAUL HEYMANS, OF BROOKLINE, MASSACHUSETTS.

DYNAMOMETER GAUGE.

Application filed May 8, 1925. Serial No. 28,804.

This invention relates to stress measuring instruments, such as dynamometers, particularly of the kind having gauges for directly reading the extent of deformation, extension or compression of a prime indicator of known resilient resistance to changes of form under the compression or tensile stress of the force to be measured.

Calibrated resilient resistances, in the form usually of heavy spring shapes, bars or rings, are sufficiently accurate indicators, by the degree of their deformation, of the quantities of applied deforming forces, but the absolute indications of such a spring as a prime indicator of the force are accurate linear functions of the applied force only when the actual deformation is slight in degree as compared with the whole deformation of which the spring bar, shape or ring is capable before reaching its elastic limit. It is therefore desirable to use a calibrated spring metal shape relatively heavy in comparison with the range of the forces to be measured, and then to measure a very small distortion of the spring shape, corresponding to the force to be measured, by some form of magnifying indicator gauge capable of response to very slight changes of dimension of the shape. Gauge devices most desirable for such purposes have a displaceable feeler and gearing adapted to transmit the displacement of the feeler by multiplying connections to a shaft carrying a pointer sweeping a visible scale. Dial and index dimension-measuring gauges of satisfactory sensitiveness and accuracy may be found on the market, for use as thickness gauges, spherometers, and for other such mensuration purposes. But so far as we are aware, whenever it has been attempted to provide a direct reading multiplying dimension gauge in association with a spring for measuring stresses, the spring and the gauge instrument have been permanently combined. This results in providing a stress-measuring instrument of a very narrow range of accurate function, and as a practical matter necessitates a very expensive equipment to cover any wide range of quantity of force. In a single day's use of such instruments, the expected forces may range from a few pounds to multiples of tons. Any attempt to measure these quantities accurately presupposes a large collection of instruments.

One object of this invention is to provide a stress-measurer in which a relatively simple and cheap prime indicator may be one of a series each of a different known capacity for distortion under a certain quantity of stress, and each adapted to be interchangeably combined with the same direct-reading measuring gauge. Other objects are to provide a prime indicator made as a calibrated spring shape adapted to be so related to a displacement or distortion measuring gauge as to enable relative motions due to distortions of the prime indicator and the measuring instrument first to be multiplied and then to be measured, thus to increase the useful range of a particular calibrated shape by effectively increasing the measurable degree of its changes of shape; and to provide for conveniently shifting the measuring gauge into accurate relation with one or another different calibrated spring shape without introducing sources of error.

These provisions result in capacity to provide one measuring gauge for use with any desired number of calibrated prime indicators, so that forces measurable over a wide range of quantities may be measured by the same gauge without inconvenience, inaccuracy or delay.

The invention will be explained as exemplified by one species only particularly adapted for use in a tension connection subject to stress in accordance with the power to be measured; for instance, in a restraining connection for a brake element, but the device is adapted without substantial change for measuring compression stresses, and for other mensuration purposes.

In the accompanying drawings,

Fig. 1 is a top plan view of a dynamometer gauge;

Fig. 2 is a bottom plan view of the gauge shown in Figure 1;

Fig. 3 is a view similar to Fig. 2 with the bottom plate removed;

Fig. 4 is a longitudinal sectional view taken on the line 4—4 of Fig. 1 looking in the direction of the arrows; and Fig. 5 is a transverse sectional view taken on the line 5—5 of Fig. 4 looking in the direction of the arrows, some of the parts being broken away.

Referring to the drawings, the prime indicator may be an integral spring-tempered metallic shape A having a normally circular opening E and cylindrical walls B adapted to flex inwardly under tension and outwardly under compression stresses acting along the line defined by the holes D in integral end lugs C. It will be understood that the spring shape A may be of any suitable form adapted to the purposes of the invention. The opening E provides a place in which an indicating gauge G is adapted to be housed.

The gauge G may be any suitably accurate and sensitive mechanism for converting displacement of a feeler bar P into angular motion of an index L in respect to a graduated dial K. Preferably the instrument G is of the kind having a dial J rotatable for adjustment with the knurled exterior bezel H. The graduations K may indicate milligrams, grams, pounds, tons or any other units of force.

The feeler bar P extends, as usual, through the gauge case, one end, to the left as shown in Figs. 3 and 4, having preferably a head R defined by an annular groove Q. The mechanism within the body casing of gauge G may be of any usual construction and may contain a spring serving to hold feeler bar P to the right of the figures, in which direction the limit of motion is by contact with the wall of opening E at the end of a longitudinal diameter. Opening E may have a recess at E' to accommodate an extreme position of bar P. A suitable washer G' preferably surrounds the gauge G between the bezel H and bar P and serves to limit and position the indicating mechanism in the aperture E of the prime indicator A.

Each prime indicator A is provided with a support for the gauge casing rigid in relation to one of the integral lugs C and its connection hole D. Conveniently this support is a stiff domed plate S having an integral lug T fastened by screws U in holes in the lug C shown as the right hand lug in the drawings. A central boss V on plate S is bored for a screw W taking into a suitable tapped hole in the gauge casing. This leaves the region of the prime indicator A at the left hand lug C and the cylindrical portion B free to move in respect to the gauge G. This motion is the index of stress, which motion may be amplified and transmitted to feeler bar P as follows:

Plate S is provided with a forked lug X, Figs. 4 and 5, in which is pivoted at Z a forked lever $a$, the forked end taking into the groove Q of bar P.

Between the pivot Z and the bar P the lever $a$ extends through an aperture $e$ in a plate $b$ received in a recess on one face of the lug C, aperture $e$ having a knife-edged lug at $f$ bearing on lever $a$. Plate $b$ is preferably adjustable, for example having a hold-down screw $c$ in a longitudinal slot $j$, a screw $g$ having an eccentric head $d$ in a transverse slot $h$ of the plate $b$ providing a delicate longitudinal adjustment for plate $b$. The motion of the forked end of lever $a$ and the gauge G, as transmitted to bar P, is augmented over the relative motions of plate S and plate $b$ by the relations of fulcrum Z, knife-edge $f$ and the length of lever $a$, as shown, by 1:3. Any other augmenting connection adapted to the obvious conditions might be substituted.

In use, tensile stresses between the holes D of the prime indicator A result in longitudinal elongation of the central portion B of the indicator A, whereupon the index L of the gauge G is increasedly displaced in proportion to the stress. The prime indicator A and its attachments S, $b$ and $a$ may be exchanged for another by removing screw W and shifting only the gauge G and its attachments, setting the zero of pointer L in respect to dial J by rotating bezel H, and proceeding with a new measurement. Substituted prime indicators may differ from each other only in the thickness of the portions B; conveniently, one gauge G may be provided with any number of prime indicators A, and a series may contain springs at B, each progressively requiring a force ten times as strong to result in a certain displacement longitudinally as the preceding member of the series.

When a compressive force acting in the line of the holes D is to be measured, screw $g$ may be turned to bring the normal position of lever $a$ to the left of the illustrated position, and thus permit bar P to be moved in an opposite sense to its motions for tension on spring indicator A.

We claim:

1. A stress measuring instrument comprising, in combination, a prime indicator adapted to be distorted by the stress, a gauge adapted to measure a linear dimension, a single fastening element for removably mounting said gauge on a part of said prime indicator for contact between said gauge and another part of said prime indicator adapted to be relatively displaced according to the stress to be measured.

2. A stress measuring instrument comprising, in combination, a prime indicator adapted to be distorted by the stress, a unitary gauge adapted to measure a linear dimension, means for removably mounting said unitary gauge on a part of said prime indicator and a connection between said gauge and another part of said prime indicator, said connection being mounted on the prime indicator externally of the gauge and being adapted to augment and to transmit relative motion between said prime indicator and a part of said gauge.

3. A stress measuring instrument comprising a spring element to be distorted by the stress to be measured, with the effect of causing relative movement of the parts of said element, a part mounted on said spring element for augmented movement as a consequence of said relative movement, and a unitary gauge for indicating the relative distortion between one of the parts of said spring element and the part causing the augmented movement, said unitary gauge being readily removable from said spring element and the part mounted thereon.

4. A stress measuring instrument comprising a primary indicator, a mounting thereon for a gauge which is adapted to measure a linear dimension, and means between said mounting and said gauge adapted to augment and transmit relative motion between parts of said indicator to said gauge.

5. A stress measuring instrument comprising a primary indicator, a mounting thereon for a gauge which is adapted to measure a linear dimension, and adjustable means between said mounting and said gauge adapted to augment and transmit relative motion between the parts of said indicator to said gauge.

6. A stress measuring instrument comprising a spring prime indicator element to be distorted by the stress to be measured with the effect of causing relative movement of the parts of said element, a part mounted on said spring element for movement relative thereto as a consequence of said relative movement and means for adjusting said part, in combination with a gauge removably mounted on said spring element and operatively connected to said part for indicating the relative separation of one of the parts of said spring element and the part causing augmented movement.

7. A stress measuring instrument comprising a metallic mounting to be distorted by the stress to be measured with the effect of causing relative movement of the parts of said mounting, a lever pivoted on one part said mounting and a connection therefrom to another part of said mounting to cause amplified motion of said lever as a consequence of said relative movement, in combination with a unitary gauge removable from said mounting for measuring the linear distance between said lever and a distant part of said mounting.

8. A stress measuring instrument comprising a spring element to be distorted by the stress to be measured, with the effect of causing relative movement of the parts of said element, means movably connected to said spring element for amplified movement as a consequence of said relative movement, in combination with means removably mounted on said spring element and in operative contact with said movable means for indicating the relative separation of one of the parts of the spring element and said movable means.

9. A stress measuring instrument comprising a spring element to be distorted by the stress to be measured with the effect of causing relative movement of the parts of said element, a yoke pivoted to one part of said spring element and connected to another part for movement as a consequence of said relative movement, in combination with a gauge removably mounted on said element and co-operating with said yoke for indicating the relative movement between the parts of said spring element.

10. A stress measuring instrument comprising a spring element to be distorted by the stress to be measured with the effect of causing relative movement of the parts of said element, a member pivoted to one of the parts for movement as a consequence of said relative movement between the parts but augmented in amount, a stop for said member carried by the other of said parts, in combination with a gauge co-operating with said pivoted member for indicating the relative movement between the parts of said spring element.

11. A stress measuring instrument comprising a spring element to be distorted by the stress to be measured with the effect of causing relative movement of the parts of said element, a member pivoted to one of the parts for movement as a consequence of said relative movement between the parts but augmented in amount, an adjustable stop for said member carried by the other of said parts, in combination with a gauge co-operating with said pivoted member for indicating the relative movement between the parts of said spring element.

12. A stress measuring instrument comprising a spring element to be distorted by the stress to be measured with the effect of causing relative movement of the parts of said element, adjustable means on one of said parts for movement as a consequence of said relative movement between the parts but augmented in amount, in combination with a gauge having a feeler bar removably mounted on said spring element and co-operating with said means for indicating the relative movement between the parts of said spring element.

13. A stress measuring instrument comprising a spring element to be distorted by the stress to be measured with the effect of causing relative movement of the parts of said element, an adjustable stop and movable member mounted on opposed parts for movement as a consequence of said relative movement between the parts but augmented in amount, in combination with a gauge having an element co-operating with said member for indicating relative movement between the parts of said spring element.

Signed by us at Cambridge, Mass., this 1st day of May, 1925.

THOMAS H. FROST.
PAUL HEYMANS.